United States Patent
Steckelberg et al.

(10) Patent No.: US 6,712,863 B2
(45) Date of Patent: Mar. 30, 2004

(54) BLACK DYE MIXTURES OF FIBER-REACTIVE AZO DYES, METHODS FOR THEIR PREPARATION AND USE THEREOF FOR DYEING HYDROXY-AND/OR CARBOXAMIDO-CONTAINING FIBER MATERIAL

(75) Inventors: Joachim Steckelberg, Brunsbüttel (DE); Ronald Pedemonte, Wesley Chapel, NC (US)

(73) Assignee: DyStar Textilfarben GmbH & Co. Deutschland KG (DE)

( * ) Notice: Subject to any disclaimer, the term of this patent is extended or adjusted under 35 U.S.C. 154(b) by 0 days.

(21) Appl. No.: 09/994,131

(22) Filed: Nov. 26, 2001

(65) Prior Publication Data

US 2003/0005529 A1 Jan. 9, 2003

Related U.S. Application Data

(60) Provisional application No. 60/254,613, filed on Dec. 11, 2000.

(51) Int. Cl.[7] .......................... D06P 1/384; C09B 67/22
(52) U.S. Cl. ..................... 8/549; 8/641; 8/918
(58) Field of Search ............... 8/546, 549, 641, 8/918

(56) References Cited

U.S. PATENT DOCUMENTS

| | | | |
|---|---|---|---|
| 5,445,654 A | 8/1995 | Hussong et al. | 8/546 |
| 5,611,821 A | 3/1997 | Huang et al. | 8/546 |
| 5,779,739 A | 7/1998 | Von Der Eltz et al. | 8/549 |
| 5,810,890 A | * 9/1998 | Russ et al. | |
| 6,171,348 B1 | 1/2001 | Russ et al. | 8/549 |
| 6,368,362 B1 | 4/2002 | Pedemonte et al. | 8/549 |

FOREIGN PATENT DOCUMENTS

| | | |
|---|---|---|
| DE | 196 20 415 | 3/1997 |
| EP | 600 322 | 11/1993 |
| EP | 679 697 | 4/1995 |
| EP | 735 112 | 3/1996 |
| EP | 832 939 | 9/1997 |
| EP | 1 046 679 | 4/2000 |
| JP | Sho-58-160 362 | 9/1983 |
| JP | 58-160362 | 9/1983 |
| KR | 94-2560 | 3/1994 |

* cited by examiner

Primary Examiner—Margaret Einsmann
(74) Attorney, Agent, or Firm—Connolly Bove Lodge & Hutz LLP

(57) ABSTRACT

A dye mixture comprising a disazo dye conforming to the general formula (1),

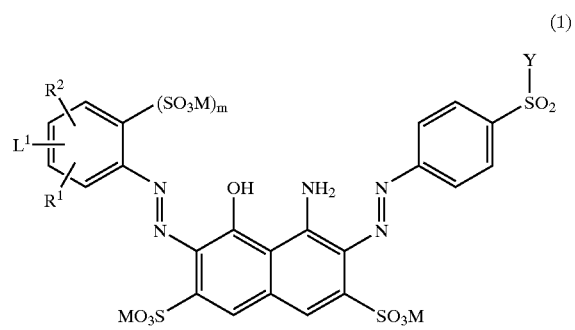

and one or more monoazo dyes conforming to the general formula

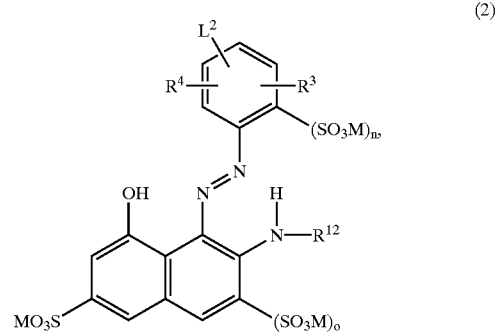

and a dye of the general formula (3)

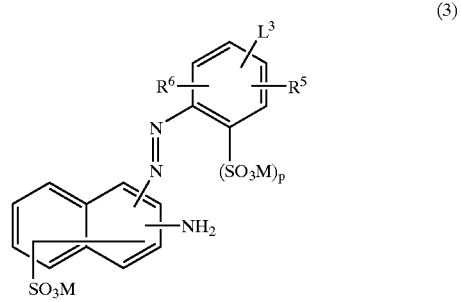

wherein
Y, M $R^1$ to $R^{12}$ and $L^1$ to $L^3$ are defined as given in claim 1.

12 Claims, No Drawings

BLACK DYE MIXTURES OF FIBER-REACTIVE AZO DYES, METHODS FOR THEIR PREPARATION AND USE THEREOF FOR DYEING HYDROXY-AND/OR CARBOXAMIDO-CONTAINING FIBER MATERIAL

RELATED APPLICATIONS

This application claims benefit to U.S. Provisional Serial No. 60/254,613 filed Dec. 11, 2000.

DESCRIPTION

The present invention relates to the field of fiber-reactive dyes.

Black-dyeing mixtures of fiber-reactive dyes are known from U.S. Pat. Nos. 5,445,654 and 5,611,821 as well as from Korean Patent Application Publication No. 94-2560. Deep black dye mixtures are known, for example, from Japanese Patent Application Publication Sho-58-160 362 which are based on a navy-blue disazo dye and an orange monoazo dye. However these dye mixtures have some deficiencies.

With the present invention, deep black-dyeing dye mixtures of improved properties, for example wash- and light-fastnesses have unexpectedly been found, comprising a disazo dye conforming to the general formula (1),

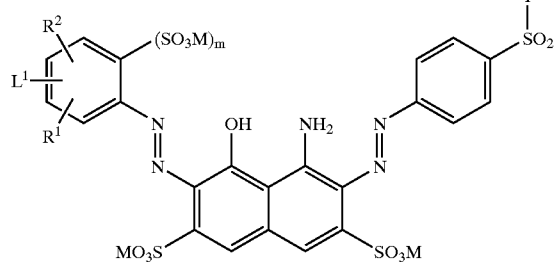
(1)

and one or more monoazo dyes conforming to the general formula

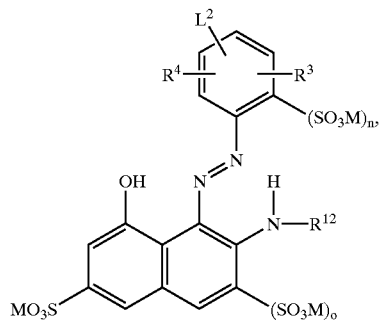
(2)

and a dye of the general formula (3)

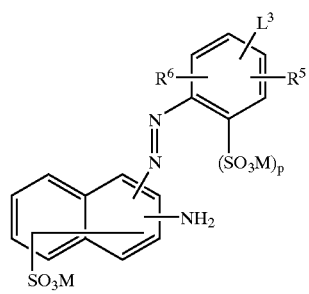
(3)

wherein

Y is in each instance, independently of one another, vinyl or is ethyl which is substituted in the β-position by a substituent which can be eliminated by the action of an alkali, forming the vinyl group, such as chlorine, thiosulfato, sulfato, alkanoyloxy of 2 to 5 carbon atoms, such as acetyloxy, phosphato, sulfobenzoyloxy and p-toluylsulfonyloxy, and is preferably vinyl, β-chloroethyl, β-thiosulfatoethyl or β-sulfatoethyl and is in particular preferably vinyl or β-sulfatoethyl;

M is hydrogen or an alkali metal, such as lithium, sodium and potassium.

$R^1$ is hydrogen methyl, or methoxy preferably hydrogen $R^2$, $R^3$, $R^4$, $R^5$, $R^6$ has one of the meanings of $R^1$ $L^1$ is a fiber-reactive group of the formulae (4a), (4b), (4c), (4d), (4e), (4f), or (4g)

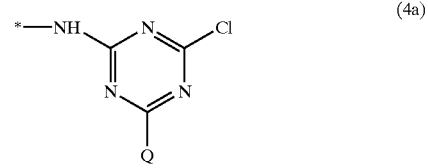
(4a)

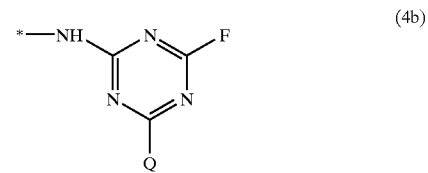
(4b)

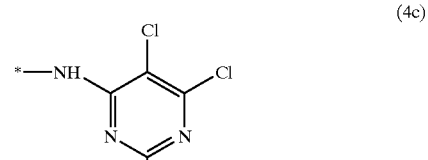
(4c)

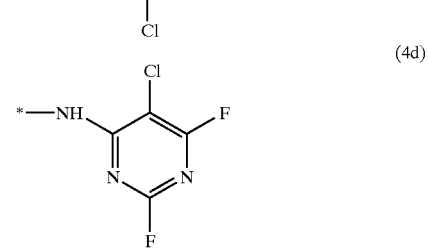
(4d)

-continued

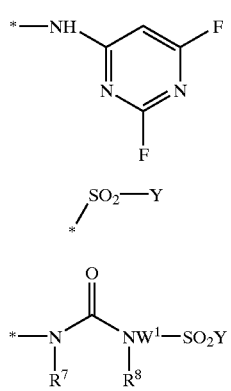

(4e)

(4g)

(4f)

where

Q is chloro, fluoro, cyanamido, hydroxy, alkoxy of 1 to 4 carbon atoms such as methyloxy, ethyloxy, n-propyloxy, i-propyloxy, tert-propyloxy, n-butyloxy, i-butyloxy, sec-butyloxy, tert-butyloxy, phenoxy, sulfophenoxy, pyridino, carboxypyridino, carbamoylpyridino or a group of the general formulae (5a) or (5b), (5a)

(5b)

in which $R^7$ is hydrogen, alkyl of 1 to 4 carbon atoms, alkoxy of 1 to 4 carbon atoms, such as methyloxy, ethyloxy, n-propyloxy, i-propyloxy, tert-propyloxy, n-butyloxy, i-butyloxy, sec-butyloxy, tert-butyloxy, sulfoalkyl of 1 to 4 carbon atoms such as sulfomethyl, sulfoethyl, sulfopropyl, sulfobutyl, phenyl which may be substituted 1 to 2 substituents such as chlorine, bromine, methyl, ethyl, methoxy, sulfo, acetamido, ureido and carboxy;

$R^8$ has one of the meanings of $R^7$;

$R^9$ and $R^{10}$ have one of the meanings given for $R^7$ or (5a) is a group of the general formula (6)

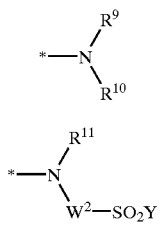

(6)

in which

T is methylene, oxygen, sulfur, sulfo, $NR^{11}$ or a chemical bond $R^{11}$, $R^{12}$ have one of the meanings of $R^7$ $W^1$ is arylene, alkylene or alkylene-arylene, each unsubstituted or substituted, wherein the alkylene moieties being preferably those of 1 to 6 carbon atoms, preferably of 1 to 4 carbon atoms, in particular of 1 to 3 carbon atoms, such as methylene, ethylene and n-propylene, or being preferably of 2 to 6 carbon atoms, if interrupted by a hetero group, such as oxygen, sulfur, amino, sulfo, carbonyl, carbonylamino, aminocarbonyl, arylene being preferably phenylene or naphthylene, the substituents of phenylene being preferably 1 or 2 substituents selected from the group consisting of alkyl of 1 to 4 carbon atoms, such as methyl and ethyl, alkoxy of 1 to 4 carbon atoms, such as methoxy and ethoxy, carboxy, sulfo and chlorine, in particular thereof methyl, ethyl, methoxy and ethoxy, and the substituents of naphthylene being preferably 1 or 2 sulfo groups, Y is defined as above and, m, n, o, p is 0 or 1

$W^2$ has one of the meanings of $W^1$ $L^2$, $L^3$ has one of the meanings of $L^1$ Preference is given to dye mixtures comprising an amount of from 40 to 95% by weight of the diazo dye of the general formula (1), from 1 to 50% by weight of one or two monoazo dye of the general formula (2) and from 1 to 50% by weight of the dye of the general formula (3) based on the dye mixture.

Special preference is given to dye mixtures comprising an amount of from 60 to 80% by weight of the disazo dye of the general formula (1), from 10 to 30% by weight of the monoazo dyes of the general formula (2) and from 10 to 30% by weight of the dye of the general formula (3) based on the dye mixture.

The groups "sulfo", "thiosulfato", "carboxy", "phosphate" and "sulfato" include both the acid form and the salt form of these groups. Accordingly, sulfo groups are groups of the formula —$SO_3M$, thiosulfato groups are groups of the formula —S—$SO_3M$, carboxy groups are groups of the formula —COOM, phosphato groups are groups of the formula —$OPO_3M_2$ and sulfato groups are groups of the formula —$OSO_3M$, in which M is defined as above.

The dye mixtures according to the present invention may also comprise one or more monoazo dye of the general formulae (7) or (8) in up to 5% by weight:

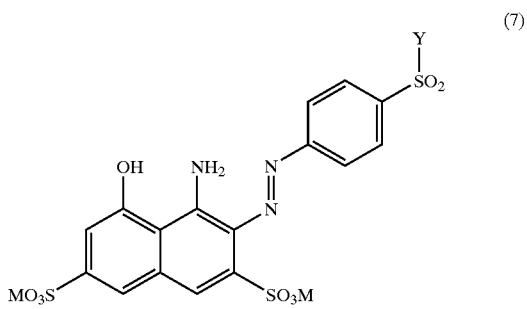

(7)

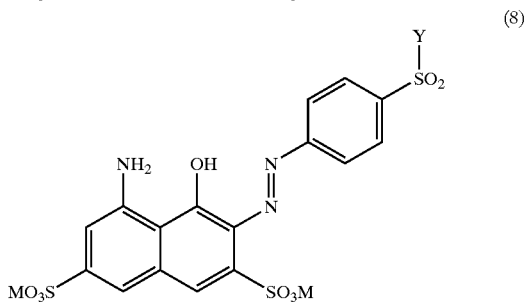

(8)

wherein M and Y are defined as above.

The dyes of the formula (7) and (8) are well known in the literature and can be synthesised by the standard methology. They are generally added as shading components.

The dyes of the general formulae (1), (2), (3), (7), (8) in particular if those corresponding to the same general formula, have the same chromophore, can have, within the meaning of Y, structurally different fiber-reactive groups —SO$_2$—Y. In particular, the dye mixture can contain dyes of the same chromophore conforming to the formula (1) and dyes of the same chromophore conforming to formula (2) and dyes of the same chromophore conforming to formula (3) and optionally likewise of the general formula (7) and (8) in which the fiber-reactive groups —SO2—Y are partly vinylsulfonyl groups and partly groups in which Y is a β-ethyl substituted group as defined above, such as β-chloroethylsulfonyl, β-thiosulfatoethylsulfonyl or, preferably, β-sulfatoethylsulfonyl groups. If the dye mixtures contain the respective dye components in the form of a vinylsulfonyl dye, the proportion of the respective vinylsulfonyl dye to the respective dye with Y being a β-ethyl substituted groups as defined above, such as a β-chloro- or β-thiosulfato- or β-sulfatoethyl-sulfonyl dye, will be up to about 30 mol-%, based on the respective dye chromophore. Preference is here given to the dye mixtures in which the proportion of vinylsulfonyl dye to said β-ethyl substituted dye, such as β-sulfatoethylsulfonyl dye is in terms of the molar ratio between 5:95 and 30:70.

The dye mixtures of the invention can be present as a preparation in solid or liquid (dissolved) form. In solid form they generally contain the electrolyte salts customary in the case of water-soluble and in particular fiber-reactive dyes, such as sodium chloride, lithium chloride, potassium chloride and sodium sulfate, and also the assistants customary in commercial dyes, such as buffer substances capable of establishing a pH in aqueous solution between 3 and 7, such as sodium acetate, sodium borate, sodium bicarbonate, sodium citrate, sodium dihydrogenphosphate and disodium hydrogenphosphate, small amounts of siccatives or, if they are present in liquid, aqueous solution (including the presence of thickeners of the type customary in print pastes), substances which ensure the permanence of these preparations, for example mold preventatives.

If the dye mixtures take the form of dye powders, they contain, as a rule, 10 to 60% by weight, based on the dye powder or preparation, of a strength-standardizing colorless diluent, for example an electrolyte salt, such as those mentioned above.

These dye powders may in addition contain the above-mentioned buffer substances in a total amount of up to 10%, based on the dye powder. If the dye mixtures of the invention are present in aqueous solution, the total dye content of these aqueous solutions is up to about 75% by weight, the electrolyte salt content of these aqueous solutions preferably being below 10% by weight, based on the aqueous solutions (liquid preparations) can in general contain the abovementioned buffer substances in an amount of up to 10% by weight, preferably up to 5% by weight.

The dye mixtures of the invention can be obtained in a conventional manner, for instance by mechanically mixing the individual dyes in the required proportions or by synthesis by means of the customary diazotization and coupling reactions using appropriate mixtures of the diazo and coupling components in a manner familiar to those skilled in the art and the necessary proportions.

Thus the dye mixture can be produced by diazotizing 4-(βsulfatoethylsulfonyl)-aniline (9)

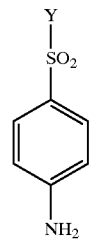

in a conventional manner in a strongly acid medium and then carrying out the coupling reaction of 1-Amino-8-napthol-3,6-disulfonic acid with the diazo component at a pH below 1.5 to form the compound (7). The second coupling reaction with the monoazo dye of formula (7) to form the disazo dyes conforming to the formula (1) is carried out at a pH between 3 and 6.5. Upon addition of an aqueous solution of sulfohydroxynapthylamine to the reaction mixture the dye conforming to the formula (2) is formed at a pH between 1 and 6.5, followed by addition of an aqueous solution of the sulfo-napthylamine to form the dye conforming to the formula (3) at a pH between 1 and 6.5. The dye mixture can be isolated from the solution in the conventional manner, for example by salting out with an electrolyte salt, such as sodium chloride or potassium chloride, or by spray-drying.

Dye mixtures in which the dye chromophores contain for example not only a β-chloroethylsulfonyl or β-thiosulfatoethylsulfonyl or β-sulfatoethylsulfonyl group but also proportions with vinylsulfonyl groups cannot only be prepared by the above mentioned method using appropriate vinylsulfonyl starting anilines, but also by reacting the dye mixture in which Y is a β-chloroethyl, β-thiosulfatoethyl, or β-sulfatoethyl radical with an amount of alkali required for only part of these groups and converting part said β-substituted ethylsulfonyl groups into vinylsulfonyl groups. This measure is carried out by generally known methods of converting β-substituted ethylsulfonyl groups into the vinylsulfonyl group.

The dye mixtures of the instant invention are well suitable for dyeing (which includes printing) hydroxy- and/or carboxamido-containing fiber materials by the application and fixing methods numerously described in the art for fiber-reactive dyes, in deep black shades with good color build-up and good wash-off in respect of unfixed dye portions. Moreover, the dyeings obtained show improved lightfastness.

The present invention therefore also provides for use of the inventive dye mixtures for dyeing (including printing) hydroxy- and/or carboxamido-containing fiber materials and processes for dyeing such fiber materials and processes for dyeing such materials using a dye mixture according to the invention by applying the dye mixture to the substrate in dissolved form and fixing the dyes on the fiber by the action of an alkali or by heating or both.

Hydroxy-containing materials are natural or synthetic hydroxy-containing materials, for example cellulose fiber materials, including in the form of paper, or their regenerated products and polyvinyl alcohols. Cellulose fiber materials are preferably cotton but also other natural vegetable fibers, such as linen, hemp, jute and ramie fibers; regenerated cellulose fibers are for example staple viscose and filament viscose.

Carboxamido-containing materials are for example synthetic and natural polyamides and polyurethanes, in particular in the form of fibers, for example wool and other animal hairs, silk, leather, nylon-6,6, nylon-6, nylon-11, and nylon-4.

Application of the dye mixtures of the invention is by generally known processes for dyeing and printing fiber materials by the known application techniques for fiber-reactive dyes. Since the dyes of the dye mixtures according to the invention are highly compatible with one another, the dye mixtures of the invention are also advantageously useful in exhaust dyeing processes. Applied in this way for example to cellulose fibers from a long liquor ratio at temperatures between 40 and 105° C., optionally at temperatures up to 130° C., under superatmospheric pressure, and optionally in the presence of customary dyeing assistants with the use of acid-binding agents and optionally neutral salts, such as sodium chloride or sodium sulfate, they produce dyeings in very good color yields with excellent color build-up and consistent shade. One possible procedure is to introduce the material into the warm bath, gradually heat the bath to the desired dyeing temperature, and complete the dyeing process at that temperature. The neutral salts which speed up the exhaustion of the dyes can also if desired not be added to the bath until the actual dyeing temperature has been reached.

Similarly, the conventional printing processes for cellulose fibers, which can either be carried out in single-phase, for example by printing with a print paste containing sodium bicarbonate or some other acid-binding agent and the colorant, and subsequent steaming at from 100 to 103° C., or in two phases, for example by printing with a neutral or weakly acid print paste containing the colorant and subsequent fixation either by passing the printed material through a hot electrolyte-containing alkaline bath or by overpadding with an alkaline electrolyte-containing padding liquour and subsequent batching of this treated material or subsequent steaming or subsequent treatment with dry heat, produce strong prints with well defined contours and a clear white ground. Changing fixing conditions has only little effect on the outcome of the prints. Not only in dyeing but also in printing the degrees of fixation obtained with dye mixtures of the invention are very high. The hot air used in dry heat fixing by the customary thermofix processes has a temperature of from 120 to 200° C. In addition to the customary steam at from 101 to 103° C., it is also possible to use superheated steam and high pressure steam at up to 160° C.

Acid-binding agents responsible for fixing the dyes to cellulose fibers are for example water-soluble basic salts of alkali metals and of alkaline earth metals of inorganic or organic acids, and compounds which release alkali when hot. Of particular suitability are the alkali metal hydroxides and alkali metal salts of weak to medium inorganic or organic acids, the preferred alkali metal compounds being the sodium and potassium compounds. These acid-binding agents are for example sodium hydroxide, potassium hydroxide, sodium carbonate, sodium bicarbonate, potassium carbonate, sodium formate, sodium dihydrogenphosphate and disodium hydrogenphosphate.

Treating the dyes of the dye mixtures according to the invention with the acid-binding agents with or without heating bonds the dyes chemically to the cellulose fiber; especially the dyeings on cellulose, after they have been given the usual aftertreatment of rinsing to remove unfixed dye portions, show excellent wet fastness properties, in particular since the unfixed dye portions are readily washed off because of their good cold water solubility.

The dyeings of polyurethane and polyamide fibers are customarily carried out from an acid medium. The dyebath may contain for example acetic acid and/or ammonium sulfate and/or acetic acid and ammonium acetate or sodium acetate to bring it to the desired pH. To obtain a dyeing of acceptable levelness it is advisable to add customary leveling assistants, for example based on a reaction product of cyanuric chloride with three times the molar amount of an aminobenzenesulfonic acid or aminonaphthalenesulfonic acid or based on a reaction product of for example stearylamine with ethylene oxide. In general the material to be dyed is introduced into the bath at a temperature of about 40° C. and agitated therein for some time, the dyebath is then adjusted to the desired weakly acid, preferably weakly acetic acid, pH, and the actual dyeing is carried out at temperature between 60 and 98° C. However, the dyeings can also be carried out at the boil or at temperatures up to 120° C. (under superatmospheric pressure).

The examples which follow illustrate the invention. Parts and percentages are by weight, unless otherwise stated. The parts by weight bear the same relation to parts by volume as the kilogram to the liter.

EXAMPLE 1

200 parts of an electrolyte-containing dye powder which contains the navy-dyeing disazo dye of the formula (A)

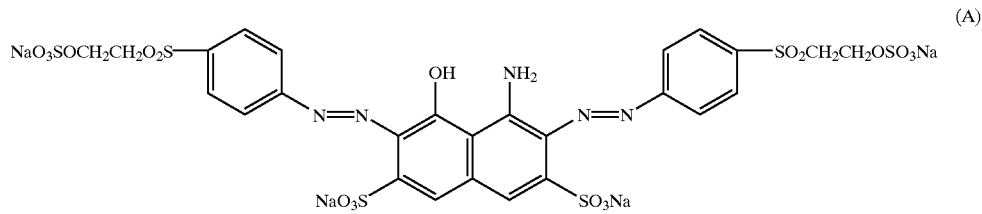

(A)

in a proportion of 50% are mechanically mixed with 75 parts of an electrolyte-containing dye powder which contains the red-dyeing monoazo of the formula (B) in a 65% proportion

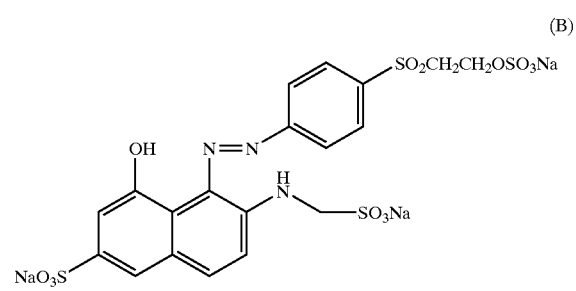

(B)

and a 25 parts of an electrolyte-containing dye powder which contains the orange-dyeing azo dye of the formula (C) in a 60% proportion

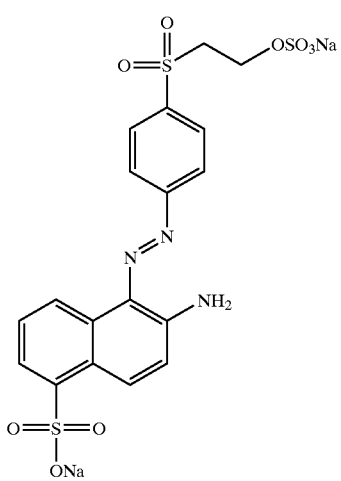

(C)

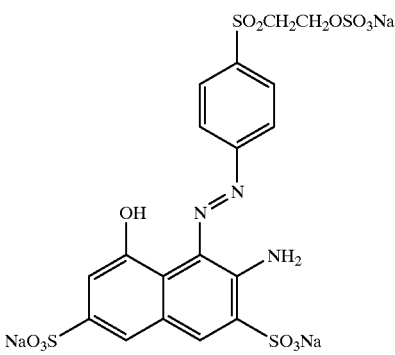

(D)

This dye solution can be adjusted to pH 4.5 by adding 5 parts of a sodium phosphate buffer. By further diluting with water or by evaporating the solution, this liquid dye mixture can then be standardized to the desired strength for a liquid preparation. The dye mixture affords deep black shades on cellulosic materials.

The resulting dye mixture according to the invention, when employed according to the application and fixing methods customary in the art for fiber-reactive dyes, produces for example on cellulose fiber materials dyeings and prints in deep black shades.

EXAMPLE 2

A dye mixture according to the invention is prepared by diazotizing a suspension of 281 parts of 4-(β-sulfatoethylsulfonyl)aniline in 650 parts of ice-water and 180 parts of 30% aqueous hydrochloric acid with 173 parts of 40% strength aqueous sodium nitrite solution. 110 parts of 1-amino-8-napthol-3,6-disulfonic acid is added and the first coupling is carried out at a pH between 1 and 1.3 and at a temperature below 20° C. (the pH is maintained with about 50 parts of sodium bicarbonate). 100 parts 2-Amino-8-hydroxynaphthalene-3,6-disulfonic acid are added to the above coupling mixture and the pH is raised to 6 with sodium carbonate at a temperature below 30° C.

To the resulting solution containing the dyes of formulae (A) and (D) are added 30 parts of an orange dye of the formula (C). The resulting dye mixture comprises dyes of the formulae (A), (D) and (C) in the ratio of about 63%:19%18%.

EXAMPLE 4 a) A suspension of 281 parts of 4-(β-sulfatoethylsulfonyl) aniline in 650 parts of ice-water and 180 parts of 30% aqueous hydrochloric acid is diazotized with 173 parts of 40% strength aqueous sodium nitrite solution. 319 parts of 1-amino-8-naphthol-3,6-disulfonic acid is added and the first coupling forming a dye of general formula (7) is carried out at a pH between 1 and 1.3 and at a temperature below 20° C. (the pH is maintained with about 50 parts of sodium bicarbonate).

b) In a separate vessel 376 parts of -2,4-diamino-phenylsulfonic acid are reacted with 268 parts 2,4,6-trifluoro-1,3-pyrimidine at a pH between 4–8 at around 30–40° C. The resulting product is isolated by addition of salt. The presscake is dissolved in 3000 parts water at pH 7 and 140 parts sodium nitrite are added thereto. The solution is pumped into a slurry of 500 parts ice and 350 parts concentrated hydrochloric acid. After stirring for 1 hour excess nitrite is destroyed using sulfamic acid and the diazo solution is pumped into solution (a). Immediately afterwards 120 parts 2-Amino-6-sulfo-8-naphthol and 110 parts 6-sulfo-2-naphtylamin are added thereto. The pH is raised to 6.5 and after the coupling is complete is spraydried to afford a mixture of dyes (E), (F), and (G):

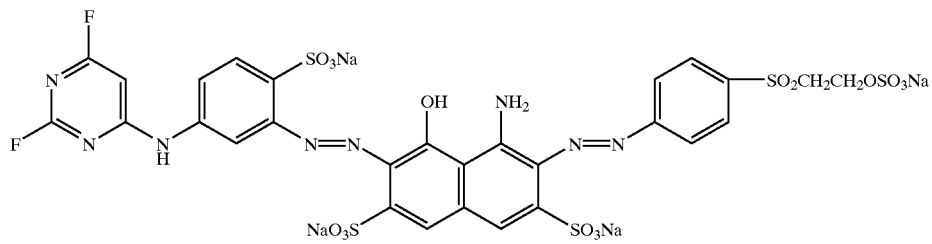

(E)

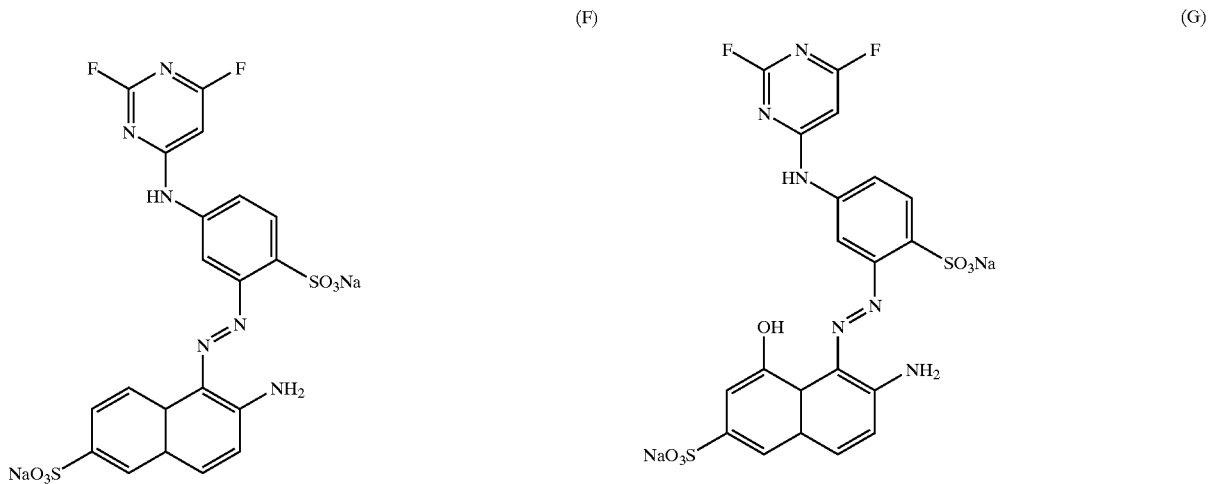

(F)     (G)

EXAMPLES 4 TO 112

The table examples which follow describe further dye mixtures according to the invention of the dyes conforming to the formulae (1)–(3) as the sodium salts of the β-Sulfatoethyl, and the mixing ratios of the dyes by percent by weight. When employed according to the application and fixing methods customary in the art for fiber-reactive dyes, these dye mixtures produce, for example, on cellulose fiber materials, deep black dyeings.

| Example | Dye of general formula (1) | Dye of general formula (3) |
|---|---|---|
| 4 | (A) | (H) |
| 5 | (A) | (H) |

-continued
| | | |
|---|---|---|
| 6 | 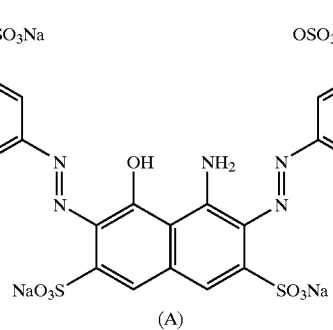 (A) | 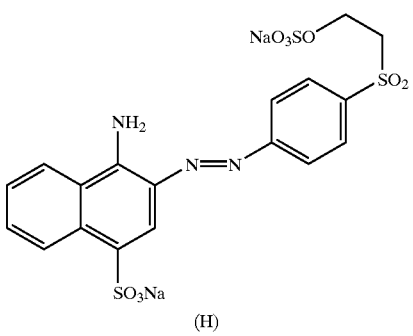 (H) |
| 7 | | 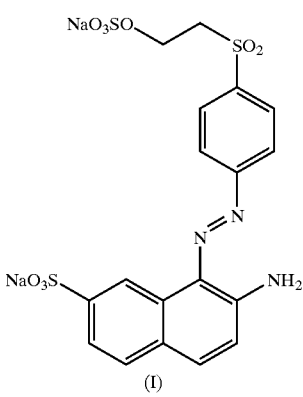 (I) |
| 8 | " | 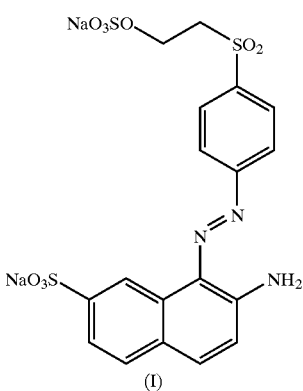 (I) |
| 9 | | 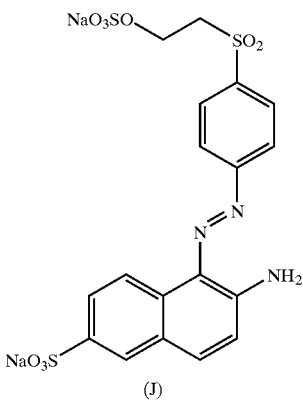 (J) |
| 10 | " | (C) |
| 11 | (A) | (C) |
| 12 | " | (H) |
| 13 | " | (I) |

-continued
| | | |
|---|---|---|
| 14 | " | (J) |
| 15 | " | (C) |
| 16 | " | (H) |
| 17 | " | (I) |
| 18 | " | (J) |
| 19 | (A) | (C) |
| 20 | " | (H) |
| 21 | " | (I) |
| 22 | " | (J) |
| 23 | | (C) |
| 24 | " | (H) |
| 25 | " | (I) |
| 26 | " | (J) |
| 27 | (A) | (C) |
| 28 | " | (H) |
| 29 | " | (I) |
| 30 | " | (J) |
| 31 | " | (C) |
| 32 | " | (H) |
| 33 | " | (I) |
| 34 | " | (J) |
| 35 | (A) | (C) |
| 36 | " | (H) |
| 37 | " | (I) |
| 38 | " | (J) |
| 39 | | (C) |
| 40 | " | (H) |
| 41 | " | (I) |
| 42 | " | (J) |
| 43 | (A) | (C) |
| 44 | " | (H) |
| 45 | " | (I) |
| 46 | " | (J) |
| 47 | " | (C) |
| 48 | " | (H) |
| 49 | " | (I) |
| 50 | " | (J) |
| 51 | (A) | (C) |
| 52 | " | (H) |
| 53 | " | (I) |
| 54 | " | (J) |
| 55 | | (C) |
| 56 | " | (H) |
| 57 | " | (I) |
| 58 | " | (J) |
| 59 | (A) | (C) |
| 60 | " | (H) |
| 61 | " | (I) |
| 62 | " | (J) |
| 63 | " | (C) |
| 64 | " | (H) |
| 65 | " | (I) |
| 66 | " | (J) |
| 67 | (A) | 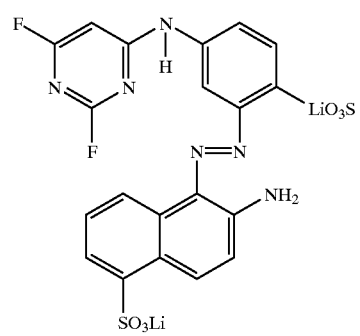 |
| 68 | " | (H) |
| 69 | " | (I) |
| 70 | " | (J) |
| 71 | | (C) |
| 72 | " | (H) |
| 73 | " | (I) |
| 74 | " | (J) |
| 75 | (A) | (C) |

-continued
| | | |
|---|---|---|
| 76 | " | (H) |
| 77 | " | (I) |
| 78 | " | (J) |
| 79 | | (C) |
| 80 | " | (H) |
| 81 | " | (I) |
| Example | Dye of general formula (2) | ratio of dyes (1):(2):(3): |
|---|---|---|
| 4 | 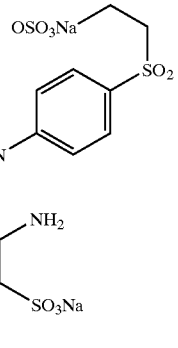 (D) | 60:20:20 |
| 5 | 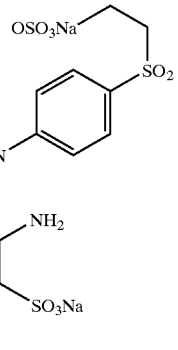 (D) | 70:15:15 |
| 6 | 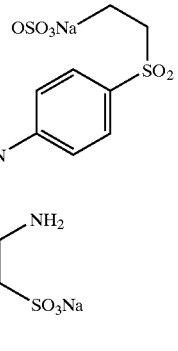 (D) | 75:20:5 |
| 7 | | 80:10:10 |
| 8 | " | 65:25:10 |
| 9 | | 75:12.5:12.5 |
| 10 | " | 70:20:10 |
| 11 | 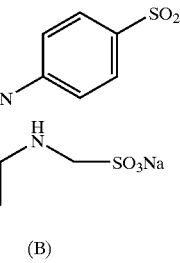 (B) | 60:20:20 |

-continued
| | | |
|---|---|---|
| 12 | 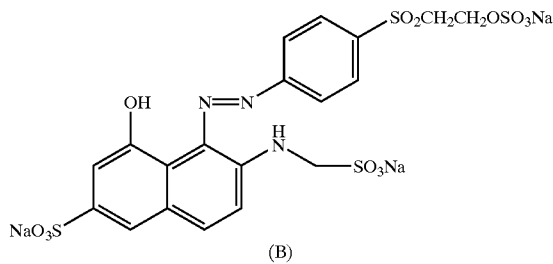 (B) | 70:15:15 |
| 13 | 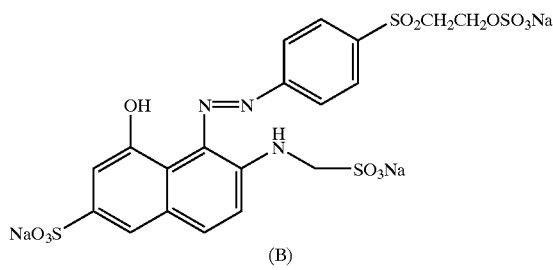 (B) | 75:20:5 |
| 14 | 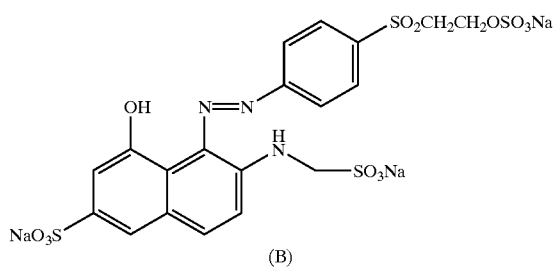 (B) | 80:10:10 |
| 15 | 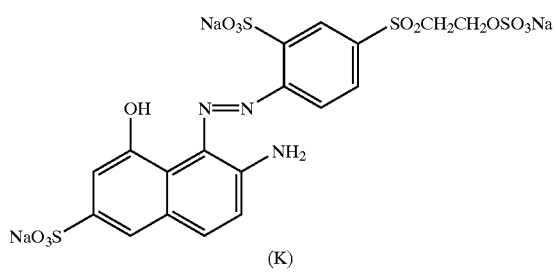 (K) | 60:20:20 |
| 16 | 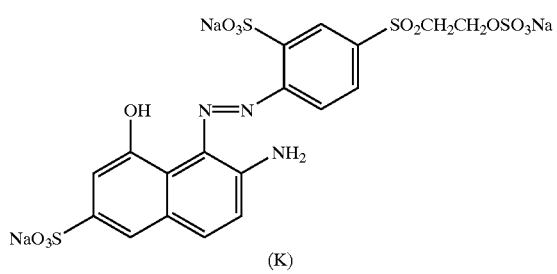 (K) | 70:15:15 |

-continued
| | | |
|---|---|---|
| 17 | 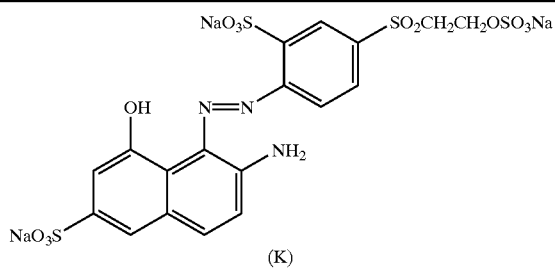 (K) | 75:20:5 |
| 18 | 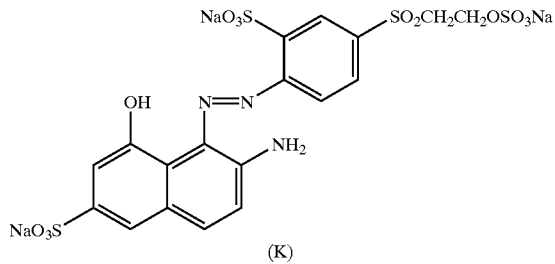 (K) | 80:10:10 |
| 19 | 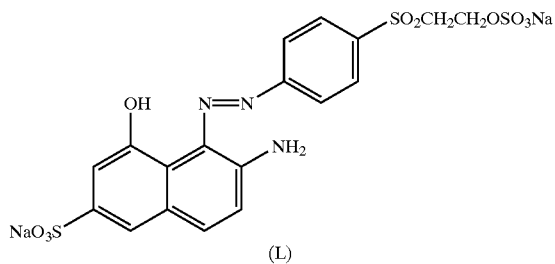 (L) | 75:15:10 |
| 20 | 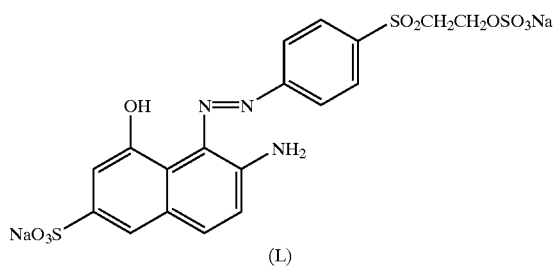 (L) | 72:13:15 |
| 21 | 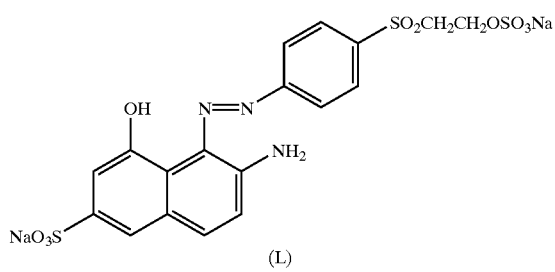 (L) | 65:15:20 |
| 22 | 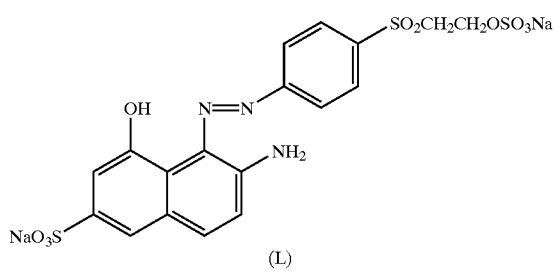 (L) | 60:20:20 |

23 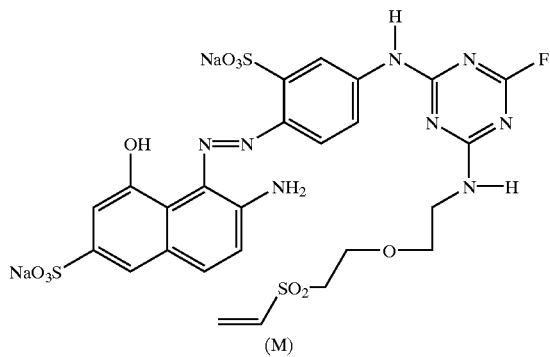 (M) 65:25:10
24 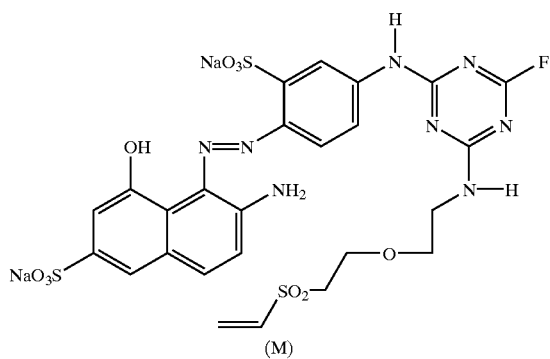 (M) 70:15:15
25 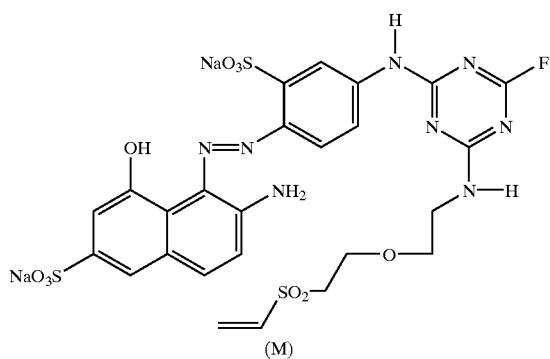 (M) 75:20:5
26 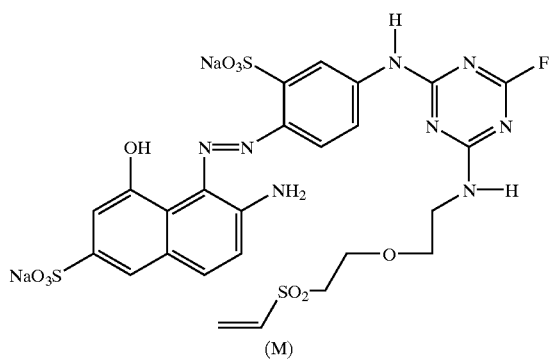 (M) 80:10:10

| 27 | 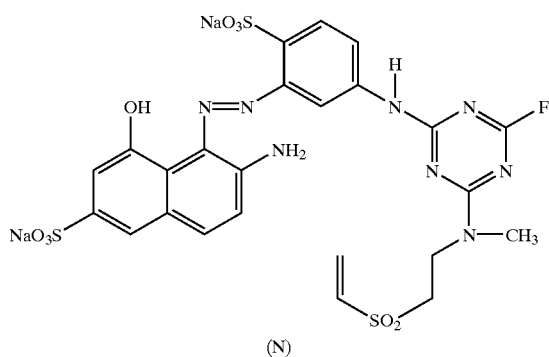 (N) | 60:20:20 |
| --- | --- | --- |
| 28 | 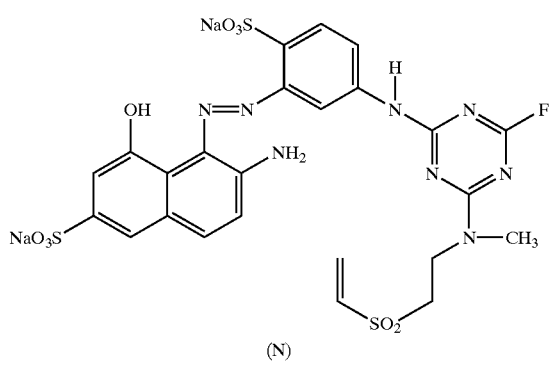 (N) | 70:15:15 |
| 29 | 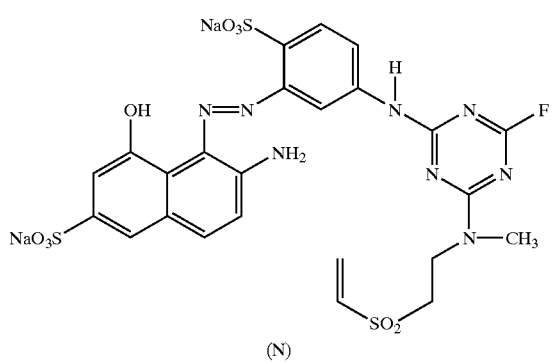 (N) | 75:20:5 |
| 30 | 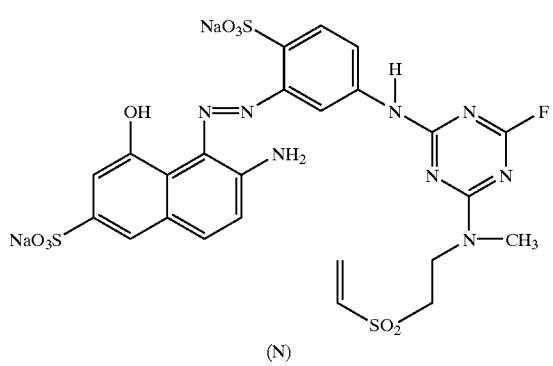 (N) | 80:10:10 |

| | | |
|---|---|---|
| 31 | 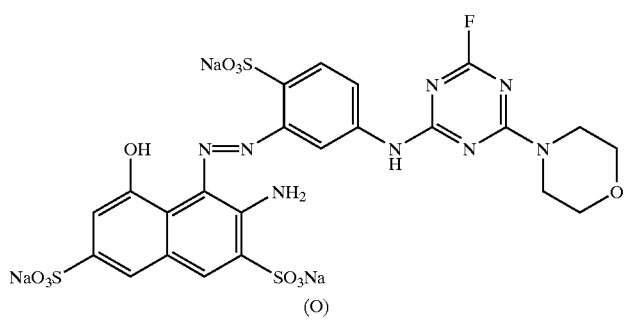 (O) | 60:20:20 |
| 32 | 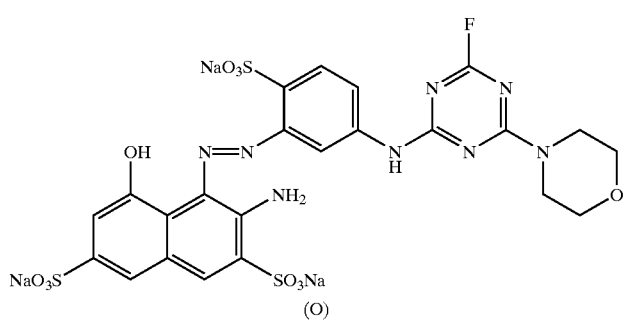 (O) | 70:15:15 |
| 33 | 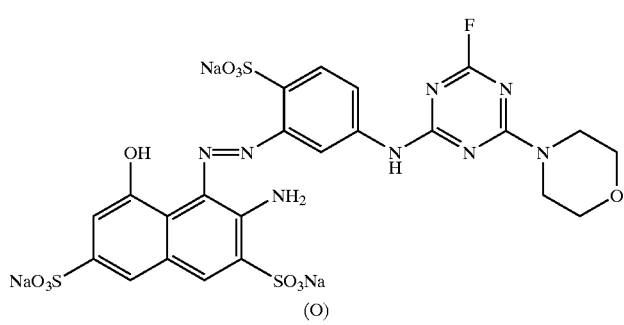 (O) | 75:20:5 |
| 34 | 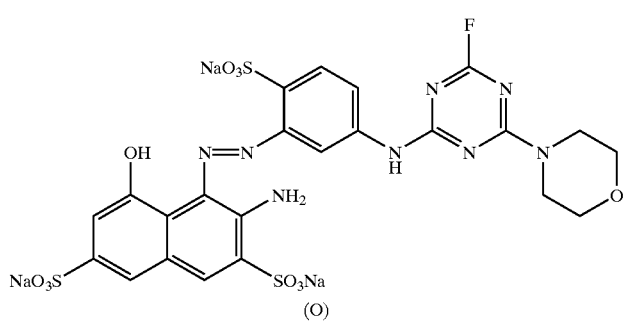 (O) | 80:10:10 |

35 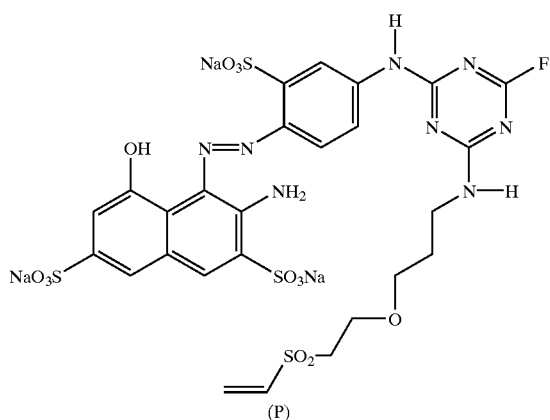 75:15:10
36 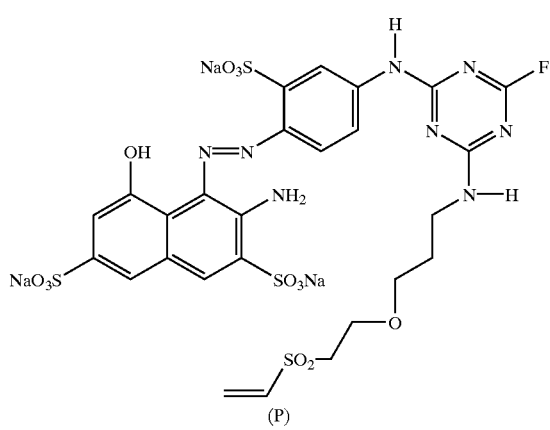 72:13:15
37 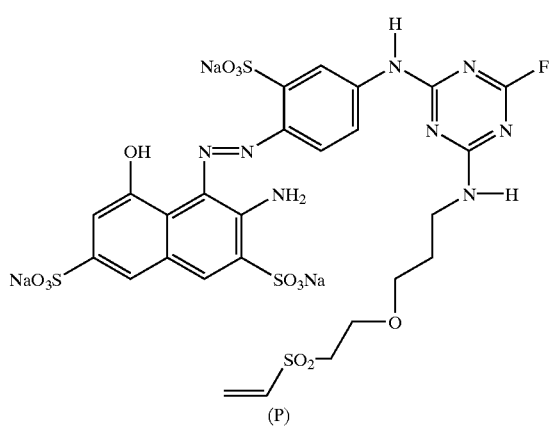 65:15:20

| 38 | 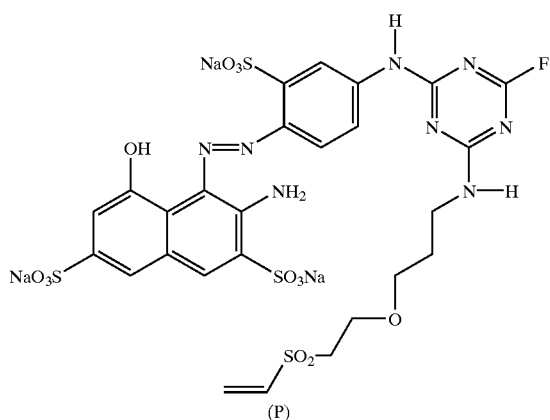 (P) | 60:20:20 |
| 39 | 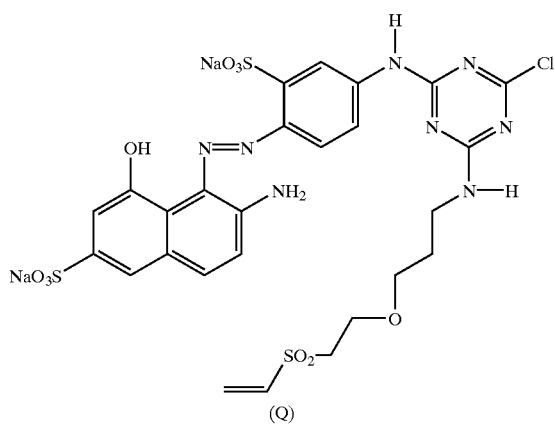 (Q) | 65:25:10 |
| 40 | 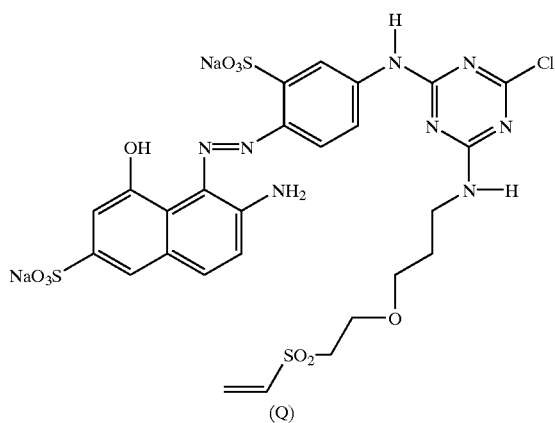 (Q) | 70:15:15 |

| 41 | 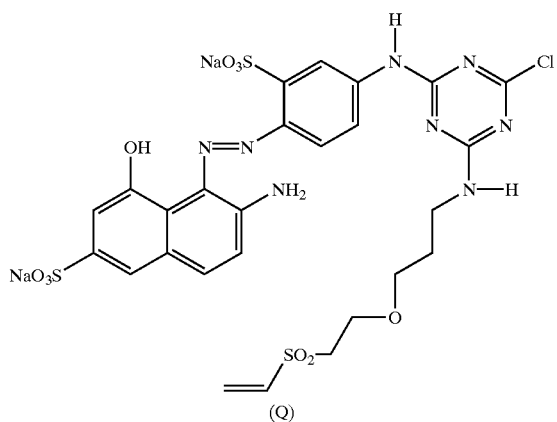(Q) | 75:20:5 |
| 42 | 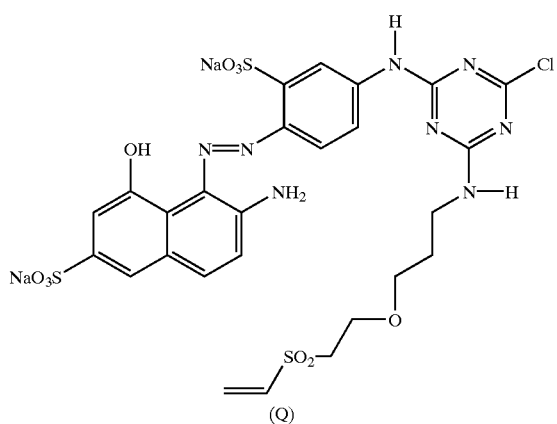(Q) | 80:10:10 |
| 43 | 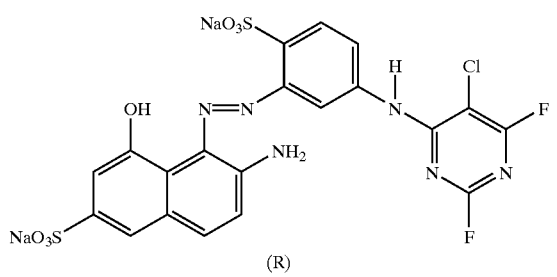(R) | 60:20:20 |
| 44 | 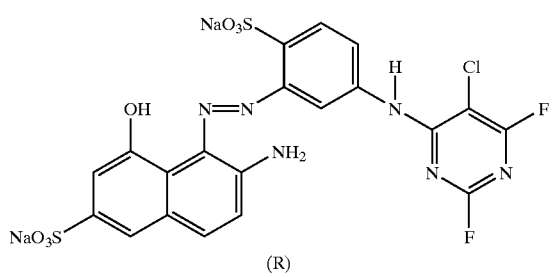(R) | 70:15:15 |

-continued
| | | |
|---|---|---|
| 45 | 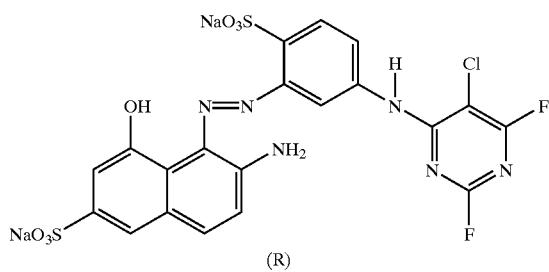 | 75:20:5 |
| 46 | 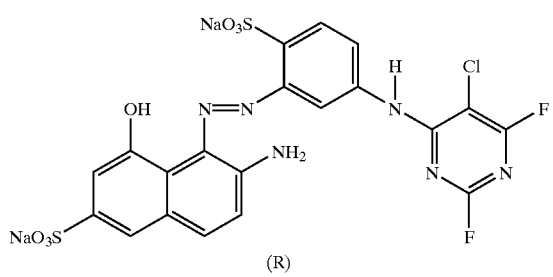 | 80:10:10 |
| 47 | 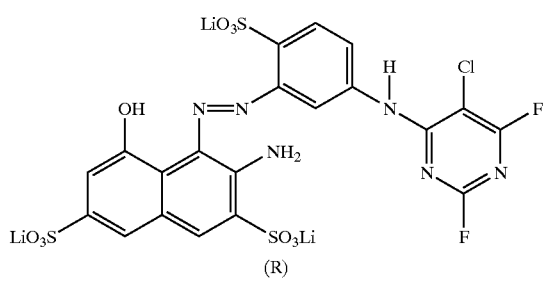 | 60:20:20 |
| 48 | 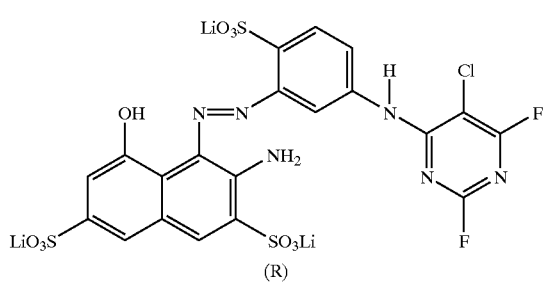 | 70:15:15 |
| 49 | 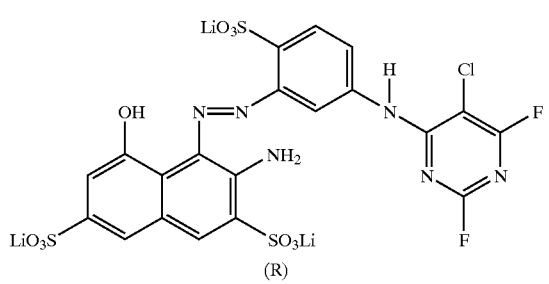 | 75:20:5 |

-continued
| | | |
|---|---|---|
| 50 | 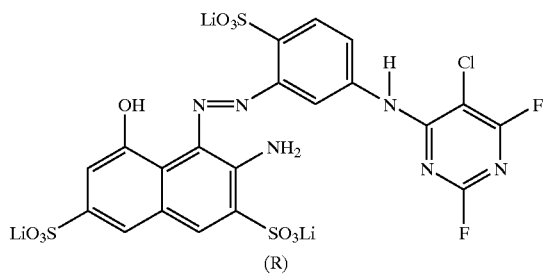 (R) | 80:10:10 |
| 51 | 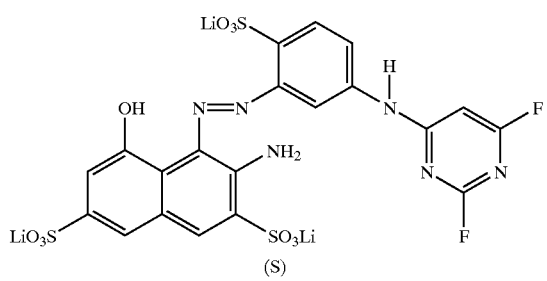 (S) | 75:15:10 |
| 52 | 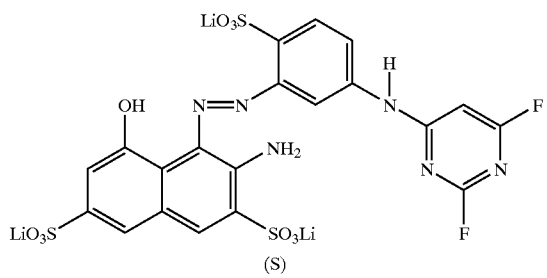 (S) | 72:13:15 |
| 53 | 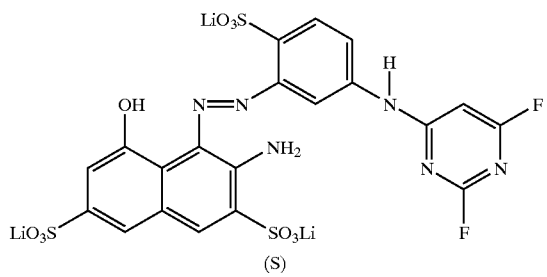 (S) | 65:15:20 |
| 54 | 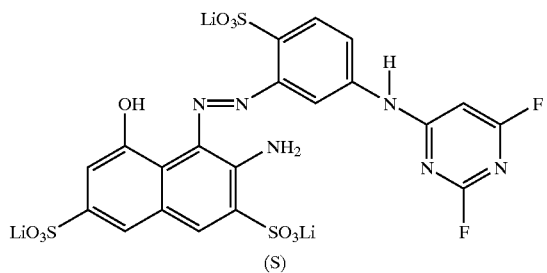 (S) | 60:20:20 |

| | | |
|---|---|---|
| 55 | 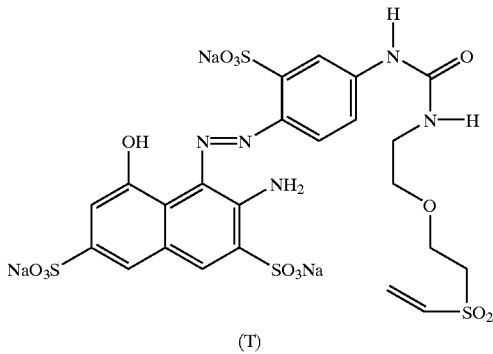 (T) | 65:25:10 |
| 56 | 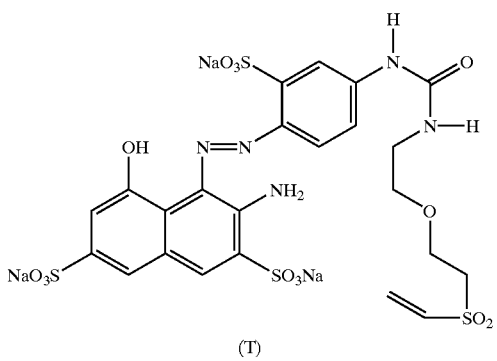 (T) | 70:15:15 |
| 57 | 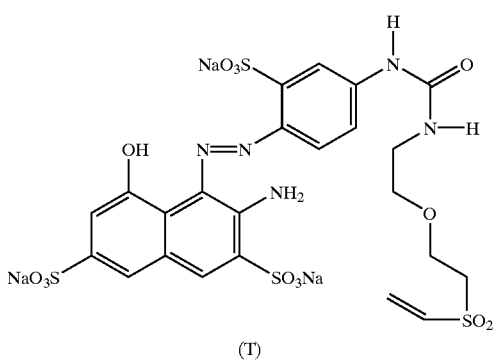 (T) | 75:20:5 |
| 58 | 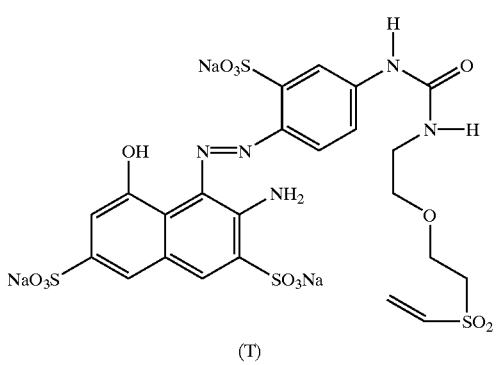 (T) | 80:10:10 |

-continued
| 59 | 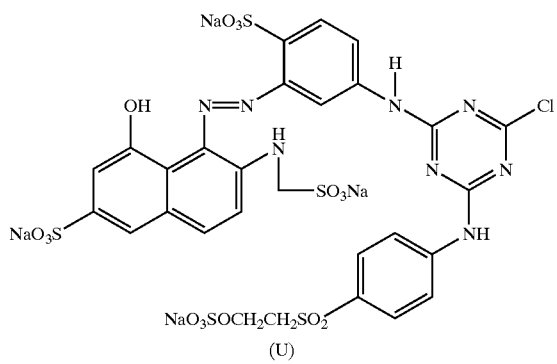 (U) | 60:20:20 |
| 60 | 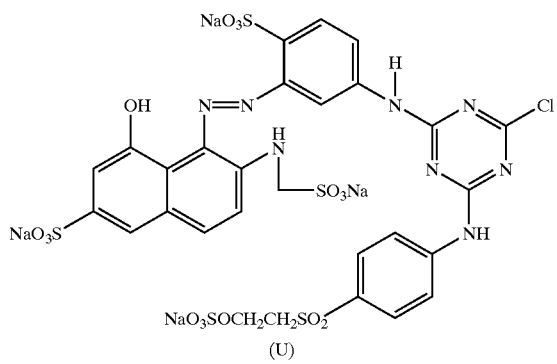 (U) | 70:15:15 |
| 61 | 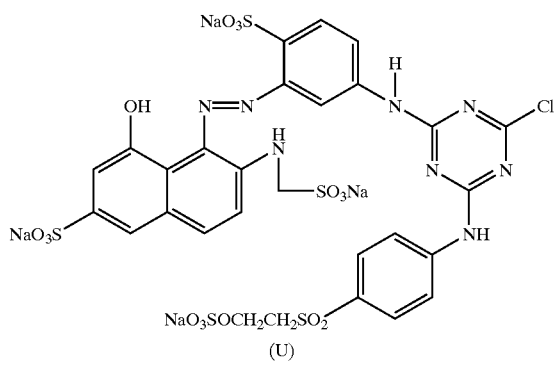 (U) | 75:20:5 |
| 62 | 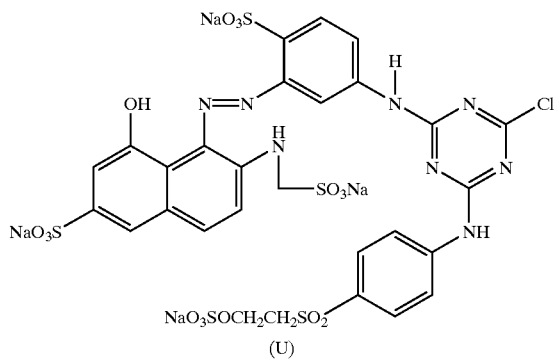 (U) | 80:10:10 |
| 63 | 50% dye (D) 50% dye (L) | 60:20:20 |
| 64 | " | 70:15:15 |
| 65 | " | 75:20:5 |
| 66 | " | 80:10:10 |

-continued
| | | |
|---|---|---|
| 67 | 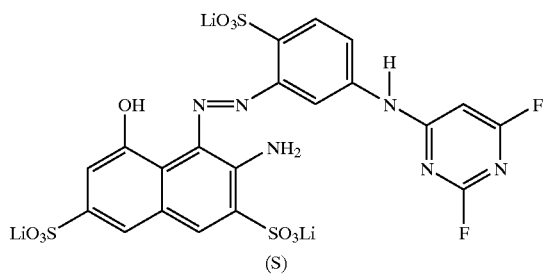 | 75:15:10 |
| 68 | 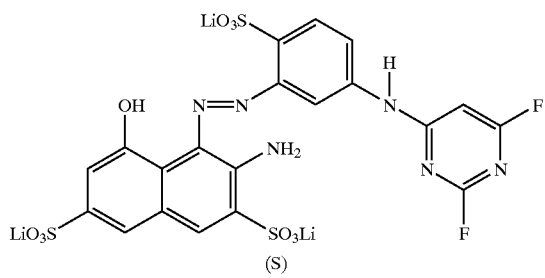 | 72:13:15 |
| 69 | 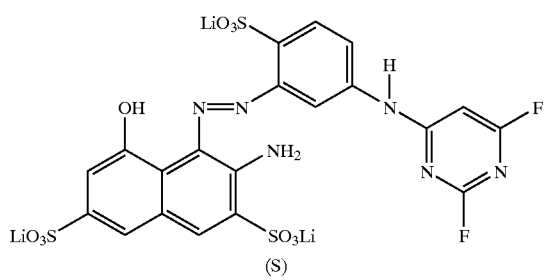 | 65:15:20 |
| 70 | 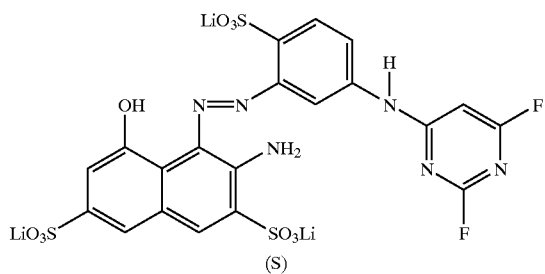 | 60:20:20 |

| | | |
|---|---|---|
| 71 | 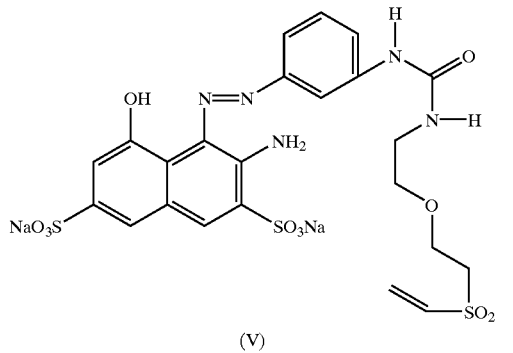 (V) | 65:25:10 |
| 72 | 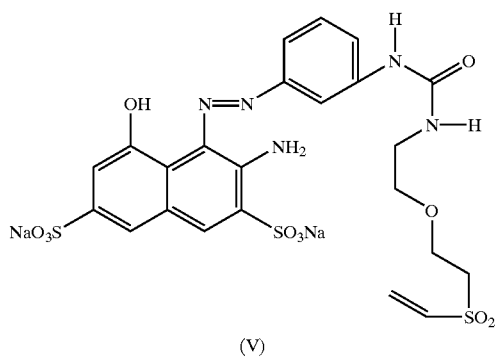 (V) | 70:15:15 |
| 73 | 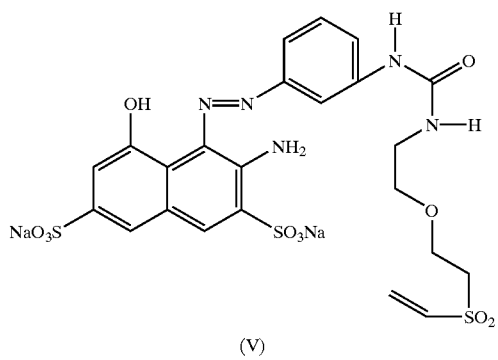 (V) | 75:20:5 |
| 74 | 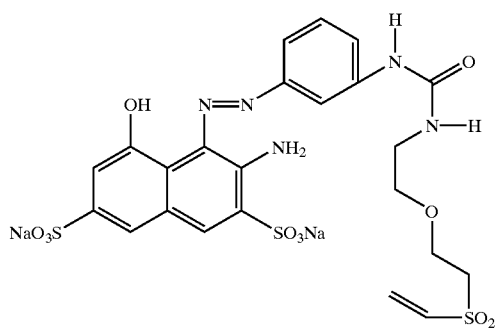 (V) | 80:10:10 |

-continued
75 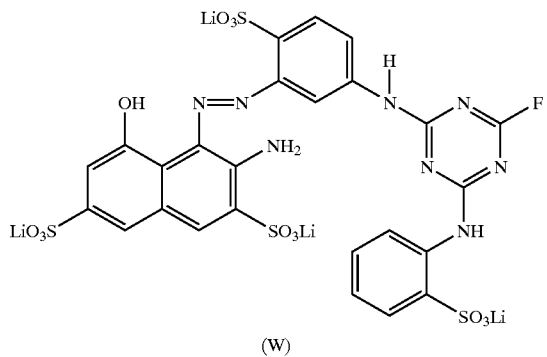 75:15:10
(W)
76 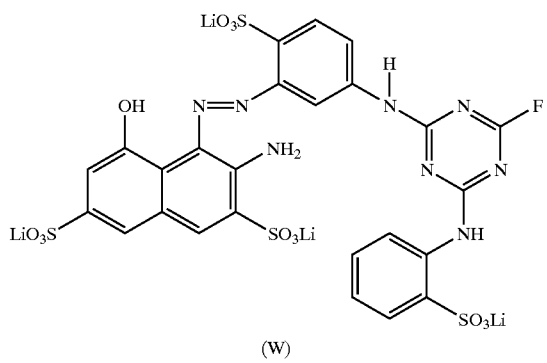 72:13:15
(W)
77 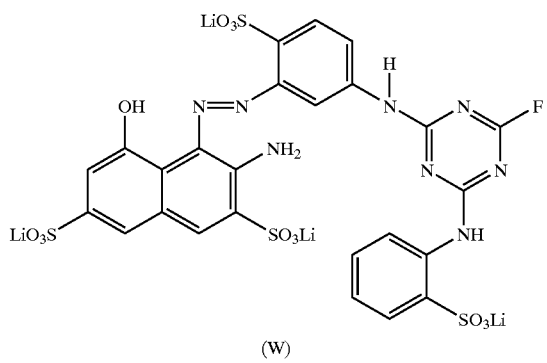 65:15:20
(W)
78 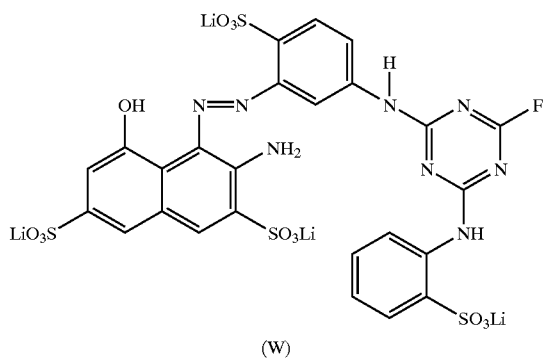 60:20:20
(W)

-continued
| | | |
|---|---|---|
| 79 | 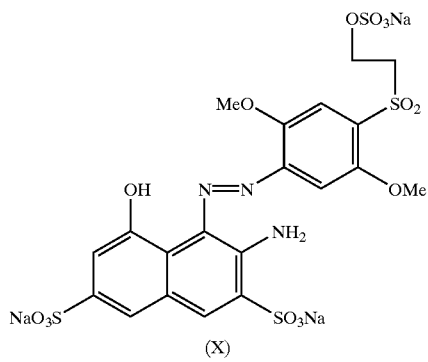 (X) | 65:25:10 |
| 80 | 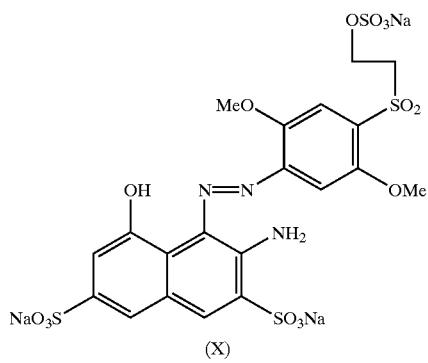 (X) | 70:15:15 |
| 81 | 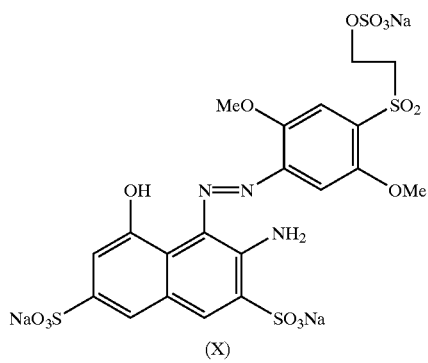 (X) | 75:20:5 |
EXAMPLE 82–158
Examples 4–81 were repeated using dye (Y) instead of dye (A):
EXAMPLES 159–235
Examples 4–81 were repeated using dye (E) instead of dye (A)
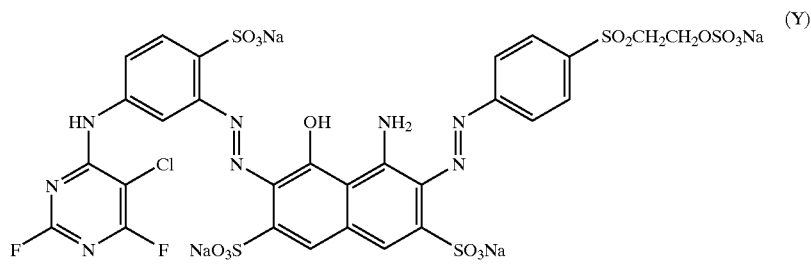
(Y)

What is claimed is:

1. A dye mixture comprising a disazo dye conforming to the general formula (1),

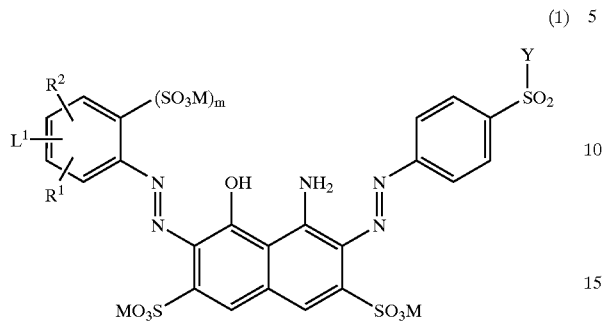
(1)

and one or more monoazo dyes conforming to the general formula (2).

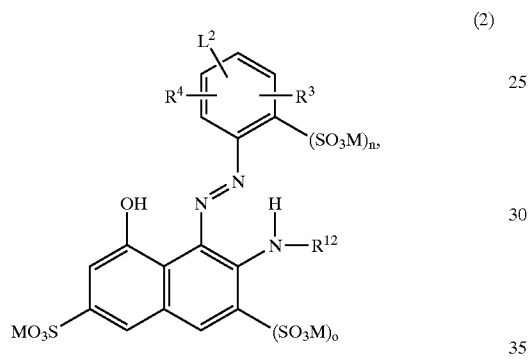
(2)

and a dye of the general formula (3),

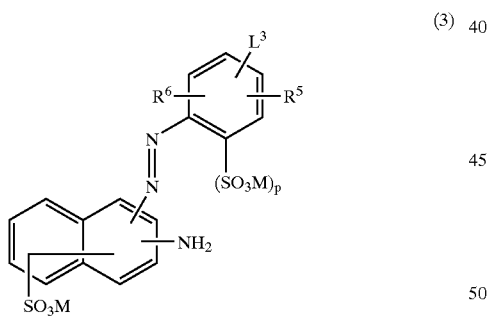
(3)

wherein

Y is in each instance, independently of one another, vinyl or is ethyl which is substituted in the $\mu$-position by a substituent which can be eliminated by the action of an alkali, fanning the vinyl group, thiosulfato, sulfato, elkmnoyloxy of 2 to 5 carbon atoms, phosphate, sulfobenzoyloxy and p-toluylsulfonyloxy;

M is hydrogen or an alkali metal, $R^1$ is hydrogen methyl, or methoxy;

$R^2$, $R^3$, $R^4$, $R^5$, $R^6$ has one of the meanings of $R^1$ $L^1$ is a fiber-reactive group of the formulae (4a), (4b), (4c), (4d), (4e), (4f), or (4g)

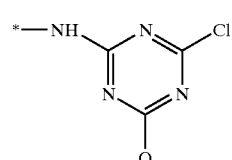
(4a)

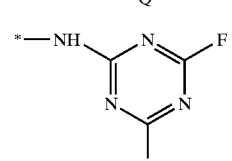
(4b)

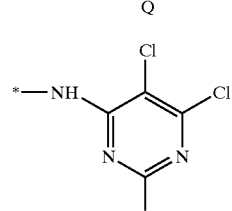
(4c)

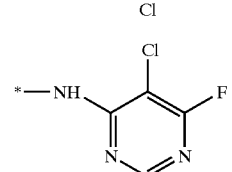
(4d)

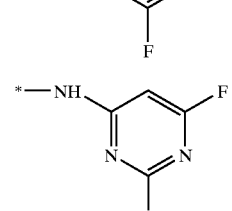
(4e)

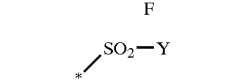
(4f)

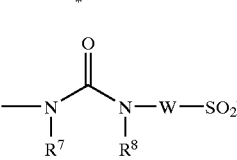
(4g)

where

Q is chloro, fluoro, cyanamido, hydroxy, alkoxy of 1 to 4 carbon atoms phenoxy, sulfophenoxy, pyridino, carboxypyridino, carbamoylpyridino or a group of the general formulae (5a) or (5b).

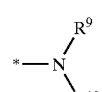
(5a)

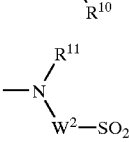
(5b)

in which $R^7$ is hydrogen, alkyl of 1 to 4 carbon atoms, alkoxy of 1 to 4 carbon atoms, sulfoalkyl of 1 to 4 carbon atoms phenyl which may be substituted 1 to 2 substituents selected from the group consisting of chlorine, bromine, methyl, ethyl, methoxy, sulfo, acetamido, ureido and carboxy;

$R^8$ has one of the meanings of $R^7$;

$R^9$ and $R^{10}$ have one of the meanings given for $R^7$ or (5a) is a group of the general formula (6)

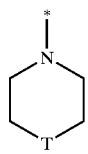
(6)

in which

T is methylene, oxygen, sulfur, sulfo, $NR^{11}$ or a chemical bond $R^{11}$, $R^{12}$ have one of the meanings of $R^7$ W is arylene, alkylene or alkylene-arylene, each unsubstituted or substituted, wherein the alkylene moieties being those of 1 to 6 carbon atoms, or being of 2 to 6 carbon atoms, if interrupted by a hetera group, arylene, the substituents of said arylene being 1 or 2 substituents selected from the group consisting of alkyl of 1 to 4 carbon atoms, alkoxy of 1 to 4 carbon atoms, carboxy, sulfo and chlorine;

Y is defined as above and, m,n,o,p is 0 or 1

$W^2$ has one of the meanings of $W^1$ $L^2$, L has one of the meanings of $L^1$.

2. The dye mixture according to claim 1, wherein the dye of formula (1) is present in the mixture in an amount of from 65 to 95% by weight; the dye of the formula (2) is present in the mixture in an amount of from 1 to 30% by weight; the dye of the formula (3) is present in the mixture in an amount of from 1 to 25% by weight.

3. The dye mixture according to claim 1, further comprising a monoazo dye of formula (7) in a total amount of 0.5 to 6.0% by weight and a monoazo dye of formula (8) in a total amount of 0.5 to 6.0% by weight, calculated on 100% by weight of the dye mixture comprising the dyes of formulae (1), (2), (3), (7), and (8)

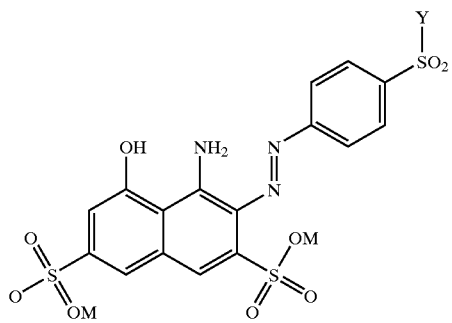
(7)

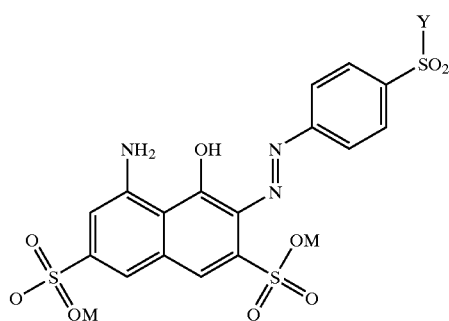
(8)

wherein:
Y is in each instance, independently of the others, vinyl or is ethyl which is substituted in the $\mu$-position by a substituent which can be eliminated by the action of an alkali, forming the vinyl group,
M is hydrogen or an alkali metal.

4. The dye mixture according to claim 1, comprising more one of the red monoazo compounds of general formula (2) in up to 25% by weight.

5. A process for the preparation of the dye mixture according to claim 3, which comprises mechanically mixing the individual dyes of the formulae (1) to (3) and (7) and (8).

6. A process for the preparation of the dye mixture according to claim 1 which comprises diazotizing an 4-($\mu$-sulfatoethylsulfonyl) aniline of the formula (9)

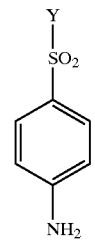
(9)

in a strongly acid medium and then crying out the coupling reaction of the 1-amino-8-napthol-3,6-disulfonic acid with the diazo component at a pH below 1.5 to form the compound (7)

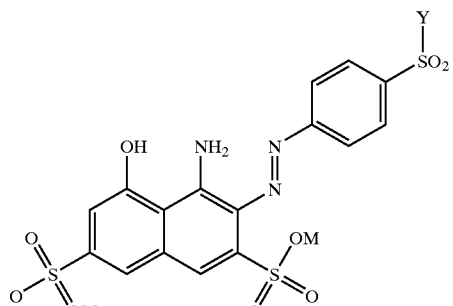
(7)

followed by the second coupling reaction of a diazo component prepared as above with the monoazo dye (7) products to form the diazo dye conforming to the formula (1) which is carried out at a pH between 3 and 6.5 and by addition of the aqueous solution of the sulfo-hydroxy-napthylamines the coupling reaction to form the dye conforming to the formula (2) which is carried out at a pH between 1 and 6.5 and subsequent addition an aqueous solution of sulonaphthylamine to form the dyestuff of the general formula (2) followed by the isolation of the dyestuff mixture from the solution.

7. The process as claimed in claim 6, wherein the isolation is carried out by salting out with the electrolyte salt.

8. A process for dyeing hydroxy- and/or carboxamido-containing fiber material, in which the inventive dyes are applied to the material and the dyes are fixed to the material by means of heat or with the aid of an alkali or by means of heat and with the aid of an alkali, which comprises dyes of the mixture as claimed in claim 1.

9. The dye mixture according to claim 1, wherein Y, is in each instance, independently of the others, vinyl or is ethyl which is substituted in the $\mu$-position by a substituent selected from the group consisting of chlorine, thiosulfato, sulfato, alkanoyloxy of 2 to 5 carbon atoms, phosphate, sulfobenzoyloxy and p-toluylsulfonyloxy and M is hydrogen, lithium, sodium or potassium.

10. The dye mixture according to claim 9, wherein Y, is in each instance, independently of the others, vinyl or is ethyl which is substituted in the $\mu$-position by a substituent selected from the group consisting of chlorine, thiosulfato, sulfato, acetyloxy, phosphato, sulfobenzoyloxy and p-toluylsulfonyloxy.

11. The dye mixture as claimed in claim 1, wherein M is lithium, sodium and potassium.

12. The dye mixture as claimed in claim 1, wherein

Y is in each instance, independently of one another, vinyl or is ethyl which is substituted in the $\mu$-position by a substituent which is chlorine, thiosulfato, sulfato, acetyloxy, phosphate, sulfobenzoyloxy and p-toluylsulfonyloxy;

Q is chloro, fluoro, cyananildo, hydroxy, -methyloxy, ethyloxy, n-propyloxy, i-propyloxy, tert-propyloxy, n-butyloxy, i-butyloxy, sec-butyloxy, tert-butyloxy, phenoxy, sulfophenoxy, pyridino, carboxypyridino, carbamoylpyridino or a group of the general formulae (5a) ox (5b),

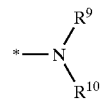
(5a)

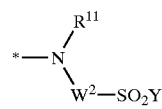
(5b)

in which $R^7$ is hydrogen, alkyl of 1 to 4 carbon atoms, methyloxy, ethyloxy, n-propyloxy, i-propyloxy, tert-propyjoxy, n-butyloxy, i-butyloxy, sec-butyloxy, tert-butyloxy, sulfomethyl, sulfo ethyl, sulfopropyl, sulfobutyl, phenyl which may be substituted 1 to 2 substituents which are selected from the group consisting of chlorine, bromine, methyl, ethyl, methoxy, sulfo, acetamido, ureido and carboxy;

W is arylene, alkylene or alkylene-arylene, each unsubstituted or substituted, wherein the alkylene moieties being methylene, ethylene and n-propylene or being of 2 to 6 carbon atoms, if interrupted by a oxygen, sulfur, amino, sulk, carbonyl, carbonylamino, aminocarbonyl, substituted phenylene or naphthylene, the substituents of phenylene being 1 or 2 substituents selected from the group consisting of methyl, ethyl, methoxy, ethoxy, carboxy, sulfo and chlorine.

* * * * *

UNITED STATES PATENT AND TRADEMARK OFFICE
CERTIFICATE OF CORRECTION

PATENT NO.    : 6,712,863 B2
DATED         : March 30, 2004
INVENTOR(S)   : Joachim Steckelberg et al.

It is certified that error appears in the above-identified patent and that said Letters Patent is hereby corrected as shown below:

Column 51,
Line 57, "$\mu$-position" should read -- ß-position --.
Line 59, "fanning" should read -- forming --.
Line 60, "elkmnoyloxy" should read -- alkanoyloxy --.

Column 52,
Line 50, "atoms phenoxy," should read -- atoms, phenoxy, --.
Line 67, '1 to 4 carbon atoms" should read -- 1 to 4 carbon atoms, --.

Column 53,
Line 29, "hetera" should read -- hetero --
Line 39, "$L^2$, L" should read -- $L^2$, $L^3$ --.

Column 54,
Lines 18 and 29, "$\mu$-position" should read -- ß-position --.
Line 43, "crying" should read -- carrying --.

Column 55,
Line 4, "(2)" should read -- (3) --.
Line 16, "$\mu$-position" should read -- ß-position --.
Line 18, "phosphate" should read -- phosphato --.
Lines 23 and 31, "$\mu$-position" should read -- ß-position --.
Line 35, "cyananildo" should read -- cyanamido --.

Column 56,
Line 4, "ox" should read - or --
Line 19, "tert-propyjoxy," should read -- tert-propyloxy, --.
Line 21, "sulfo ethyl," should read -- sulfoethyl --.

UNITED STATES PATENT AND TRADEMARK OFFICE
CERTIFICATE OF CORRECTION

PATENT NO. : 6,712,863 B2
DATED : March 30, 2004
INVENTOR(S) : Joachim Steckelberg et al.

It is certified that error appears in the above-identified patent and that said Letters Patent is hereby corrected as shown below:

<u>Column 56, (continuation),</u>
Line 30, "sulk," should read -- sulfo --.

Signed and Sealed this

Tenth Day of August, 2004

JON W. DUDAS
*Acting Director of the United States Patent and Trademark Office*